Patented Aug. 30, 1932

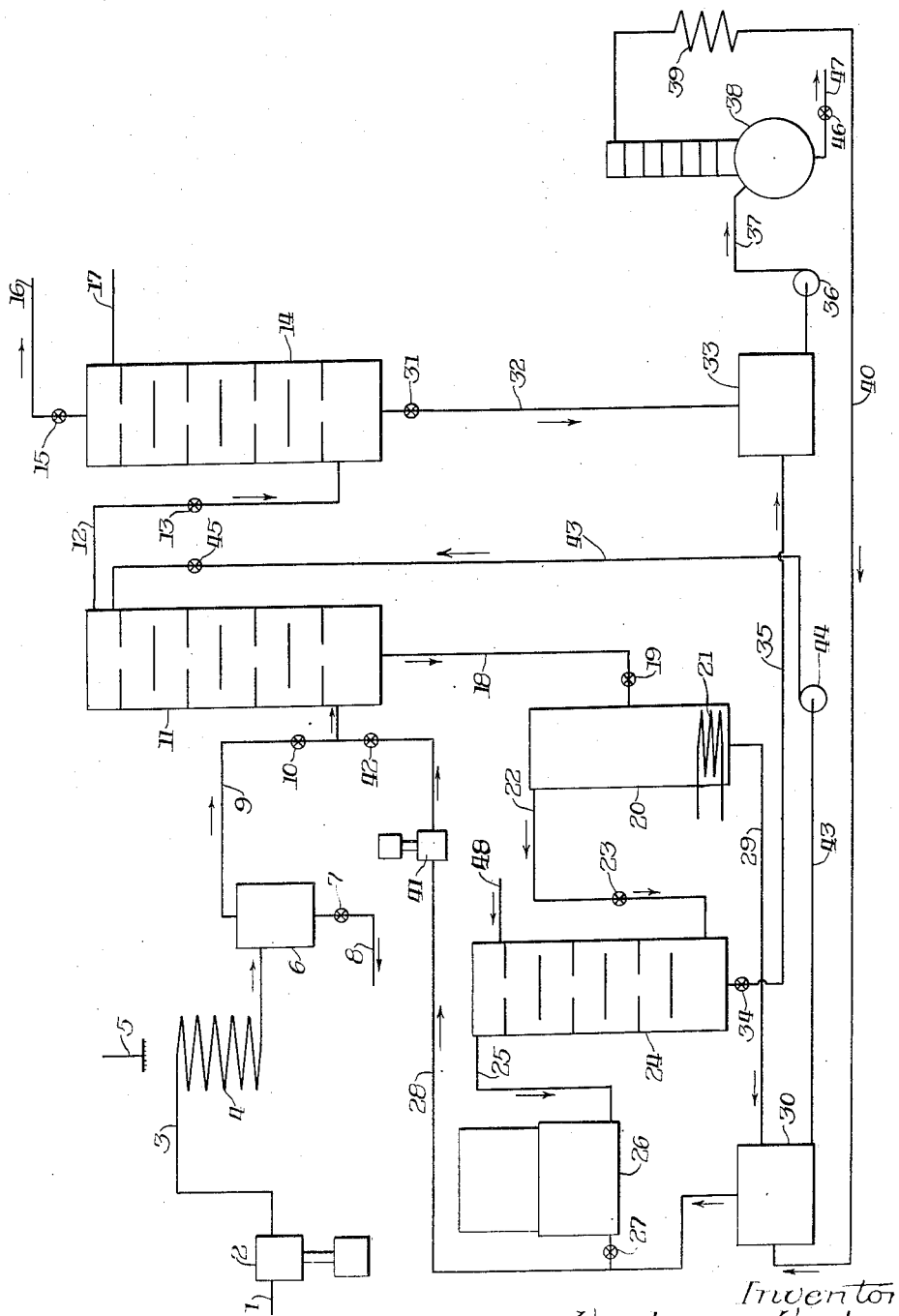

1,875,311

UNITED STATES PATENT OFFICE

VANDERVEER VOORHEES AND MERRILL A. YOUTZ, OF HAMMOND, INDIANA, ASSIGNORS TO STANDARD OIL COMPANY, OF CHICAGO, ILLINOIS, A CORPORATION OF INDIANA

PROCESS OF CONCENTRATING OLEFINES

Application filed November 22, 1929. Serial No. 409,073.

This invention relates to a process of treating gaseous hydrocarbon mixtures containing olefins as constituents thereof, to obtain a gaseous mixture richer in olefins than that treated, and it comprises a process wherein such mixtures are contacted with a water soluble absorbent liquid having preferential solubility for the olefins; and it further comprises a process wherein such a gaseous mixture is compressed and cooled to liquefy less volatile constituents, the liquefied portions removed, the residual gas contacted with a water soluble absorbent liquid such as alcohol, glycerine, or glycol, the olefin gases preferentially dissolved in such absorbent, thereafter removed therefrom, and the absorbent liquid recovered for re-use.

In many of the modern oil refinery operations, such as distillation, cracking, etc., great quantities of gaseous mixtures, collectively known as still gases, are formed. Until recently, it has been the general practice to conduct such gases under the stills to be there burned for heating purposes, since these gases contain large quantities of combustible hydrocarbons. Perhaps the most important constituents of such gaseous mixtures are the olefins, namely ethylene, propylene and higher unsaturated aliphatic hydrocarbons. Ethylene and propylene are rapidly becoming industrial raw materials. There are many processes for converting these gases into useful substances such as glycols and chlorhydrins, and from these materials cellulose solvents and a large number of valuable chemicals may be prepared.

At the present time, however, it is customary to prepare ethylene derivatives, from sources other than still gases, and many tons of potentially valuable ethylene in still gases are allowed to go to waste or are used only for heating purposes. This is largely due to the fact that the ethylene and propylene in the still gases are associated with large quantities of undesirable substances, such as methane, ethane and hydrogen. Indeed, such gases may contain as little as 10% of olefins, but on the average the composition will be about 35 percent olefins and about 65 percent saturated hydrocarbons and hydrogen. Because of the difficulty in separating still gases into their constituents in a convenient and economical way, ethylene, for industrial purposes, is customarily made from ethyl alcohol by a dehydration process or by cracking natural gas.

Processes of recovering ethylene and propylene from still gases, have been proposed, wherein reliance is placed upon water insoluble absorbent liquids such as gasoline, benzene, or other liquids of a hydrocarbon nature to preferentially dissolve the desired gases. Use of absorbents of this type has not been very satisfactory, principally for the reason that there is not a very large difference between the solubilities of the saturated and unsaturated hydrocarbons in benzene or in gasoline.

We have now found that the use of water soluble solvents for ethylene and propylene, more particularly the alcohols such as ethyl alcohol, glycerine and glycol, as absorbent mediums, presents numerous advantages. Under appropriate temperature and pressure conditions, ethylene is soluble in 95 percent alcohol to the extent of about 2500 cc. per liter whereas methane and ethane are soluble only to the extent of about 400 cc. per liter.

Propylene is even more soluble than ethylene. These solubility differences are much larger than in gasoline or in benzene and we find that the use of alcohols permits a more complete separation (or concentration) of the olefins from the saturated aliphatic hydrocarbons associated therewith. Use of water soluble absorbents presents an additional advantage in that scrubbing of the gases leaving the absorption tower is greatly simplified since water can be used as the scrubbing liquid effecting a separation of the absorbent liquid from the gases in an economical manner. Recovery of the absorbent for re-use can be done without providing the complicated scrubbing or solvent recovery systems ordinarily required when using water insoluble absorbent liquids.

On the attached single sheet of drawing, we have indicated in diagrammatic form a representative flow sheet of an advantageous way of putting our invention into practice.

In the drawing, raw olefinic gases coming from a suitable source of supply are brought through line 1 into compressor 2 where they are compressed to a pressure of about 150 pounds per square inch. The pressure to be used will vary in accordance with the composition of the gas to be treated. When butylene, butanes, and higher hydrocarbons are present in large amounts, the pressure required to liquefy all of these undesirable constituents may have to be decreased. This is a matter easily determined for any particular gas.

The compressed gases are then passed by line 3 to a cooler 4 over which water is sprayed by means of sprayer 5. The liquefied portions of the gases collect in a reservoir 6, and are drawn off through valve 7 and line 8. The uncondensed portions of the original gases pass by line 9 and valve 10 to the bottom of a plate tower 11. A water soluble absorbent liquid is pumped from storage tank 30 through line 43, pump 44 and valve 45 to the top of the tower 11. In the tower we have conventionally illustrated baffle plates to provide surface for absorption, but we may also use bubble plates or other device to obtain contact between liquid and gases. It is desirable to regulate the rate of flow of absorbent liquid (i. e. its quantity per unit time) so that the gases leaving the top of the tower will be substantially free from the olefins it is desired to absorb.

The olefinic gases, stripped of their less volatile constituents pass upwards through the tower, meeting a downwardly flowing stream of absorbent liquid. Undissolved gases, chiefly methane, ethane and hydrogen, together with vapors of the absorbent liquid, leave the tower through line 12, pass through pressure reducing valve 13 and into scrubbing tower 14 wherein they meet a downwardly flowing stream of water introduced into the tower at the top thereof through line 17. The spent gases finally pass out through valve 15 and line 16 to be used for fuel or otherwise.

Tower 11 is provided with an outlet pipe 18 at the bottom thereof to convey the solution of dissolved gases through reducing valve 19 and into flashdrum 20 wherein the pressure is reduced, releasing most of the dissolved gases, now chiefly ethylene and propylene, together with reduced quantities of methane and ethane. Heat may be applied to the absorbent liquid in this drum by steam coil 21 to obtain more complete removal of gases if desired. The gases leaving drum 20 by pipe 22 and valve 23 to the bottom of a second scrubbing tower 24 wherein, in their upward passage, they meet a downwardly flowing stream of water introduced through line 48. This scrubbing operation is for the purpose of recovering the vapors of the absorbent liquid which are carried along with the released gases. The gases, freed from absorbent liquid, leave the scrubbing tower 24 by line 25 and are conveyed to a gas holder 26, where they are ordinarily maintained until used. If desired, they may be recycled through the apparatus in order to further free them from saturated hydrocarbons, employing valve 27 and line 28 for this purpose. The absorbent liquid, freed of most of its dissolved gases, is conducted by pipe 29 to the storage tank 30 from which it is pumped back into the process for re-use.

The water solution of absorbent liquid, flowing from scrubber 14, is conveyed by valve 31 and pipe 32 to a storage tank 33. Likewise the water solution of absorbent liquid leaving scrubber 24 is passed into tank 33 by valve 34 and pipe 35.

The dilute solution of absorbent liquid passes by pump 36 and line 37 into still 38 where the absorbent liquid is removed from the water by fractional distillation. In the case of liquids which are more volatile than water such as alcohol, the vapors are concentrated in the fractionating tower and condensed in coil 39, the condensed liquid passing by line 40 to receiver 30. Undissolved gases are vented from tank 30 through line 28 to the absorber tower 11 by means of booster pump 41 and valve 42. Water, freed of absorbent liquid, is discharged from the still through valve 46 and line 47.

In carrying out our process on a gas containing about 35% olefins, ethylene, propylene and higher unsaturated hydrocarbons, the remainder being methane, ethane and hydrogen, and when using 95% ethyl alcohol as the absorbent liquid, we find that ethylene is about 5.5 to 6 times more soluble than the saturated hydrocarbons. This means that in a single absorption cycle with the alcohol. the concentrated olefinic gases conveyed to the gas holder will analyze about 76% olefins, (ethylene and propylene), the remainder being saturated aliphatic hydrocarbons and not much hydrogen. If much propylene is present in the raw gases, propylene being even more soluble than ethylene in alcohol, we find that the concentration of the olefins in the gases conducted to the gas holder amounts to about 85% but of course these percentages depend somewhat upon the initial composition of the gas entering the system.

We advantageously impose a pressure of 5 to 10 atmospheres on the gases during the absorption thereof in the absorbent liquid. It is usually desirable to partially reduce the pressure on the gases before going to the solvent recovery tower 14, but this is not essential to the satisfactory working of the process.

Use of a water soluble absorbent liquid is particularly advantageous when dealing with gases, very low in olefins, in the neighborhood of 6–10%, for example, because higher pressures can be used without danger of liquefied ethylene or propylene separating out and thus the quantity of alcohol or other water soluble absorbent liquid can be considerably reduced, less being required when operating under high pressures.

Furthermore, we find that the water soluble alcohols have only a slight temperature coefficient of solubility for ethylene and propylene. This means that we need not take steps to control accurately the temperature conditions during the absorption of the olefins in the alcohol. Temperatures around 60 to 80° F. (ordinary room temperatures) are adequate for our purpose but rather wide variations therefrom, having regard, of course, for the nature of the process, will not be detrimental.

While we have more specifically referred to 95% ethyl alcohol as the absorbent liquid, it should be understood that other water soluble alcohols can be used such as methyl alcohol or isopropyl alcohol. Pure ethylene or propylene glycol, or glycerine, or these alcohols in aqueous solutions, are also useful. For commercial purposes, at the present time, the alcohols appear to be most practical. But the use of other water soluble liquid absorbents also falls with the scope of our invention provided the absorbent shows a preferential absorption for ethylene or propylene. That is to say, the absorbent must have the property of dissolving greater quantities of these gases than gases of the saturated aliphatic hydrocarbon series.

Water may be used alone as the selective solvent, in which case, solvent recovery scrubbers can be dispensed with thus simplifying the operation of the process. However, when water is used alone, it is necessary to operate at higher pressures to obtain the same capacity because of the lower solubility of olefin gases in water.

While most still gases contain ethylene and propylene in varying amounts, our process is, of course, applicable to any gaseous mixture containing ethylene or propylene, or both. That is to say, our process may be used with any sort of gaseous mixture containing ethylene and/or propylene associated with other gases whose solubility in a water soluble absorbent liquid is less than the solubility of ethylene and propylene, in order to obtain a gaseous mixture richer in ethylene or propylene or both, than that treated.

What is claimed is:

1. The process of treating gaseous hydrocarbon mixtures containing olefins as a constituent thereof, to obtain a gaseous mixture, richer in olefins than that treated, which includes subjecting the gaseous mixture to the action of an alcoholic water soluble absorbent liquid having the property of preferentially absorbing olefins.

2. The process of treating gaseous hydrocarbon mixtures containing olefins as a constituent thereof, to obtain a gaseous mixture, richer in olefins than that treated, which includes subjecting the gaseous mixture to the action of 95 percent ethyl alcohol.

3. The process of treating gaseous hydrocarbon mixtures, containing ethylene, propylene and saturated aliphatic hydrocarbons as constituents thereof, to obtain a gaseous mixture richer in ethylene and propylene than that treated which includes subjecting the gaseous mixture under pressure to the action of an alcoholic absorbent liquid, having the property of preferentially absorbing ethylene and propylene.

4. The process of treating gaseous hydrocarbon mixtures, containing ethylene, propylene and saturated aliphatic hydrocarbons as constituents thereof, to obtain a gaseous mixture richer in ethylene and propylene than that treated which includes subjecting the gaseous mixture under pressure to the action of a solution of ethyl alcohol.

5. The process of treating gaseous hydrocarbon mixtures containing ethylene and propylene, as constituents thereof, to obtain a gaseous mixture richer in ethylene and propylene than that treated, which comprises compressing and cooling the gaseous mixture to liquefy less volatile constituents thereof, subjecting the uncondensed gases under pressure to the action of an alcoholic absorbent liquid, and heating the absorbent liquid to drive off gases absorbed therein.

6. The process of treating gaseous hydrocarbon mixtures containing ethylene and propylene, as constituents thereof, to obtain a gaseous mixture richer in ethylene and propylene than that treated, which comprises compressing and cooling the gaseous mixture to liquefy less volatile constituents thereof, subjecting the uncondensed gases under pressure to the action of a solution of ethyl alcohol, and heating the alcohol to drive off gases absorbed therein.

7. The process of treating gaseous hydrocarbon mixtures containing ethylene and propylene as constituents thereof to obtain a gaseous mixture richer in ethylene and propylene than that treated, which comprises compressing and cooling the gaseous mixture to liquefy less volatile constituents thereof, subjecting the uncondensed gases under pressure to the action of an inert water soluble absorbent liquid having the property of preferentially absorbing the ethylene and propylene, scrubbing unabsorbed gases with water to recover any vapors of the absorbent liquid present in the unabsorbed gases, reducing the pressure on the absorbent liquid to release absorbed gases and fit the absorbent liquid for re-use, scrubbing the gases driven off with water to free them from vapors of absorbent liquid, concentrating the aqueous solutions of absorbent liquid and returning absorbent liquid to the system.

8. The process of treating a gaseous hydrocarbon mixture containing ethylene and propylene as constituents thereof to obtain a gaseous mixture richer in ethylene and propylene than that treated, which comprises compressing the gaseous mixture, subjecting the gases under pressure to the action of an alcoholic absorbent liquid having the property of preferentially absorbing the ethylene and propylene, scrubbing unabsorbed gases with water to recover any vapors of the absorbent liquid present in the unabsorbed gases, heating the absorbent liquid to drive off absorbed gases and fit the absorbent liquid for re-use, scrubbing the gases driven off with water to free them from vapors of absorbent liquid, concentrating the aqueous solutions of absorbent liquid, and return absorbent liquid to the system.

9. The process of treating gaseous hydrocarbon mixture containing ethylene and propylene as constituents thereof to obtain a gaseous mixture, richer in ethylene and propylene than that treated, which comprises compressing and cooling the gaseous mixture to liquefy less volatile constituents thereof, subjecting the uncondensed gases under pressure to the action of a solution of ethyl alcohol, scrubbing unabsorbed gases with water to recover any vapors of the alcohol present in the unabsorbed gases, reducing the pressure on the alcohol to release absorbed gases and fit the alcohol for re-use, scrubbing the gases driven off with water to free them from vapors of alcohol, concentrating the aqueous solutions of alcohol, and returning alcohol to the system.

10. The process of treating gaseous hydrocarbon mixtures containing ethylene and saturated aliphatic hydrocarbons to obtain a gas richer in ethylene than that treated which includes subjecting the gaseous mixture to the action of an alcoholic water soluble absorbent liquid.

11. The process of treating gaseous hydrocarbon mixtures containing ethylene and saturated aliphatic hydrocarbons to obtain a gas richer in ethylene than that treated which includes subjecting the gaseous mixture to the action of 95 percent alcohol.

12. The process of separating olefinic and non-olefinic hydrocarbon gases by selectively absorbing the olefinic gases in an alcoholic solution under superatmospheric pressure, and separately removing the olefinic gases from the solution, the separated gases being subsequently scrubbed with water to recover vapors of alcohol.

MERRILL A. YOUTZ.
VANDERVEER VOORHEES.